(12) United States Patent
Ito et al.

(10) Patent No.: US 6,356,579 B1
(45) Date of Patent: Mar. 12, 2002

(54) RADIO PAGING SYSTEM

(75) Inventors: Shogo Ito, Yokohama; Yasushi Yamao, Yokosuka; Shinzo Ohkubo, Tokorozawa, all of (JP)

(73) Assignee: NTT Communications Network, Inc., Tokyo (JP)

( * ) Notice: Subject to any disclaimer, the term of this patent is extended or adjusted under 35 U.S.C. 154(b) by 0 days.

(21) Appl. No.: 09/171,884

(22) PCT Filed: Feb. 27, 1998

(86) PCT No.: PCT/JP98/00842

§ 371 Date: Jan. 19, 1999

§ 102(e) Date: Jan. 19, 1999

(87) PCT Pub. No.: WO98/38815

PCT Pub. Date: Sep. 3, 1998

(30) Foreign Application Priority Data

Feb. 28, 1997 (JP) .............................................. 9-045711

(51) Int. Cl.[7] .............................................. H04L 27/30
(52) U.S. Cl. .................... 375/130; 375/141; 340/825.44
(58) Field of Search ................. 375/130, 140, 375/141, 146, 147; 340/825.44; 455/38.1, 31.1, 31.2, 31.3, 561

(56) References Cited

U.S. PATENT DOCUMENTS

| 4,882,579 | A | * | 11/1989 | Siwiak | .................. | 340/825.44 |
|---|---|---|---|---|---|---|
| 5,430,760 | A | | 7/1995 | Dent | | |
| 5,870,426 | A | * | 2/1999 | Yokev et al. | ................ | 375/202 |
| 6,021,311 | A | * | 2/2000 | Gibson et al. | ............. | 455/31.3 |

FOREIGN PATENT DOCUMENTS

| JP | 7-79477 | 3/1995 |
|---|---|---|
| JP | 10-13879 | 1/1998 |
| JP | 10-013879 | 1/1998 |
| JP | 10-51820 | 2/1998 |

OTHER PUBLICATIONS

"A Way to Next–Generation High Performance Communications," Yukiji Yamauchi, Spread Spectrum Communications, Nov. 20, 1994.

* cited by examiner

Primary Examiner—Stephen Chin
Assistant Examiner—Dac V. Ha
(74) Attorney, Agent, or Firm—Brown Raysman Millstein Felder & Steiner LLP

(57) ABSTRACT

A paging system including one or more pagers having a transmitting function. The pagers can transmit to a base station a response upward signal acknowledging reception of a paging signal, and a pager initiative signal through direct sequence spread spectrum modulation. The pager assigns different spreading codes to the response upward signal acknowledging the reception of the paging signal and the pager initiative signal, so that the base station can receive them independently.

15 Claims, 17 Drawing Sheets

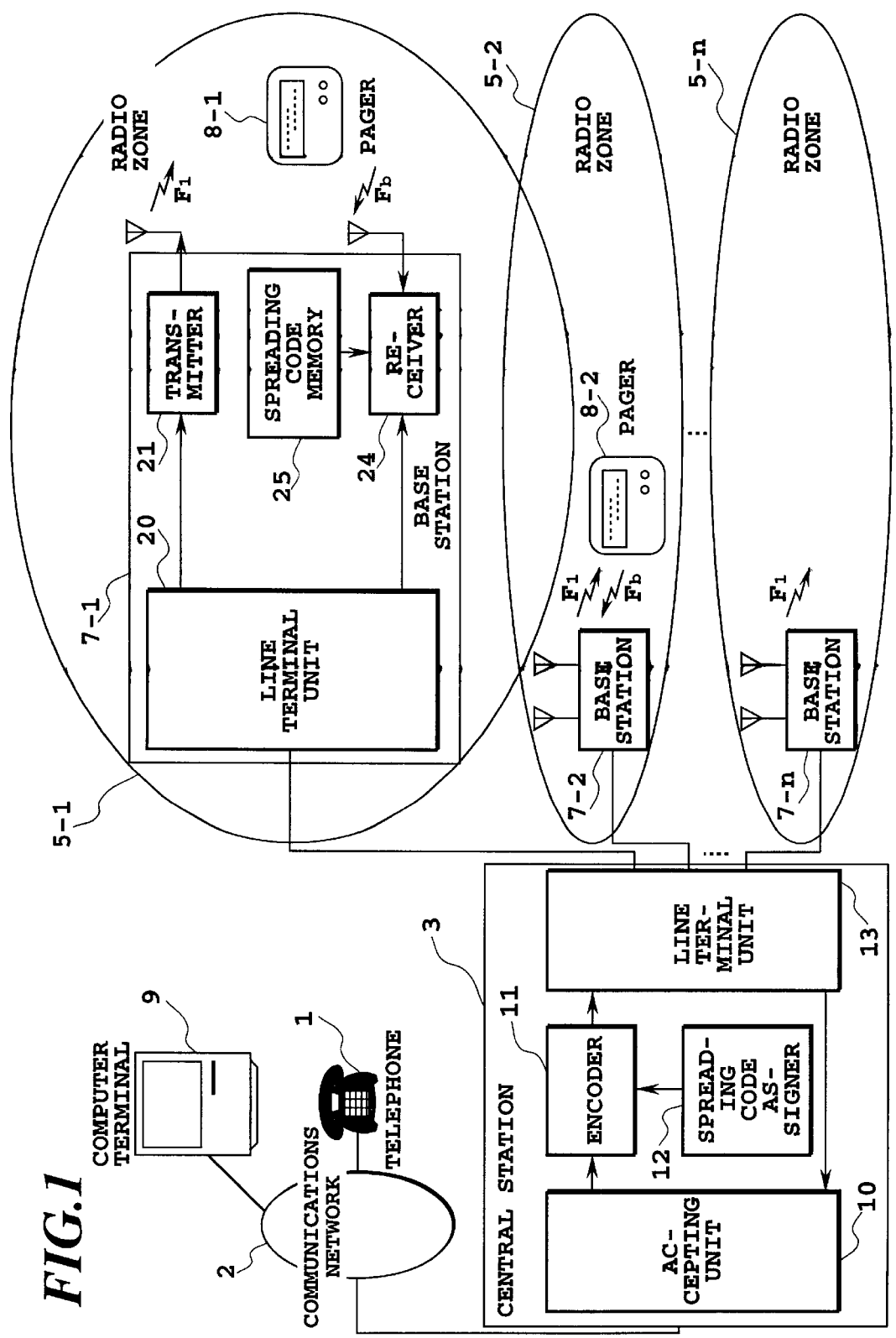

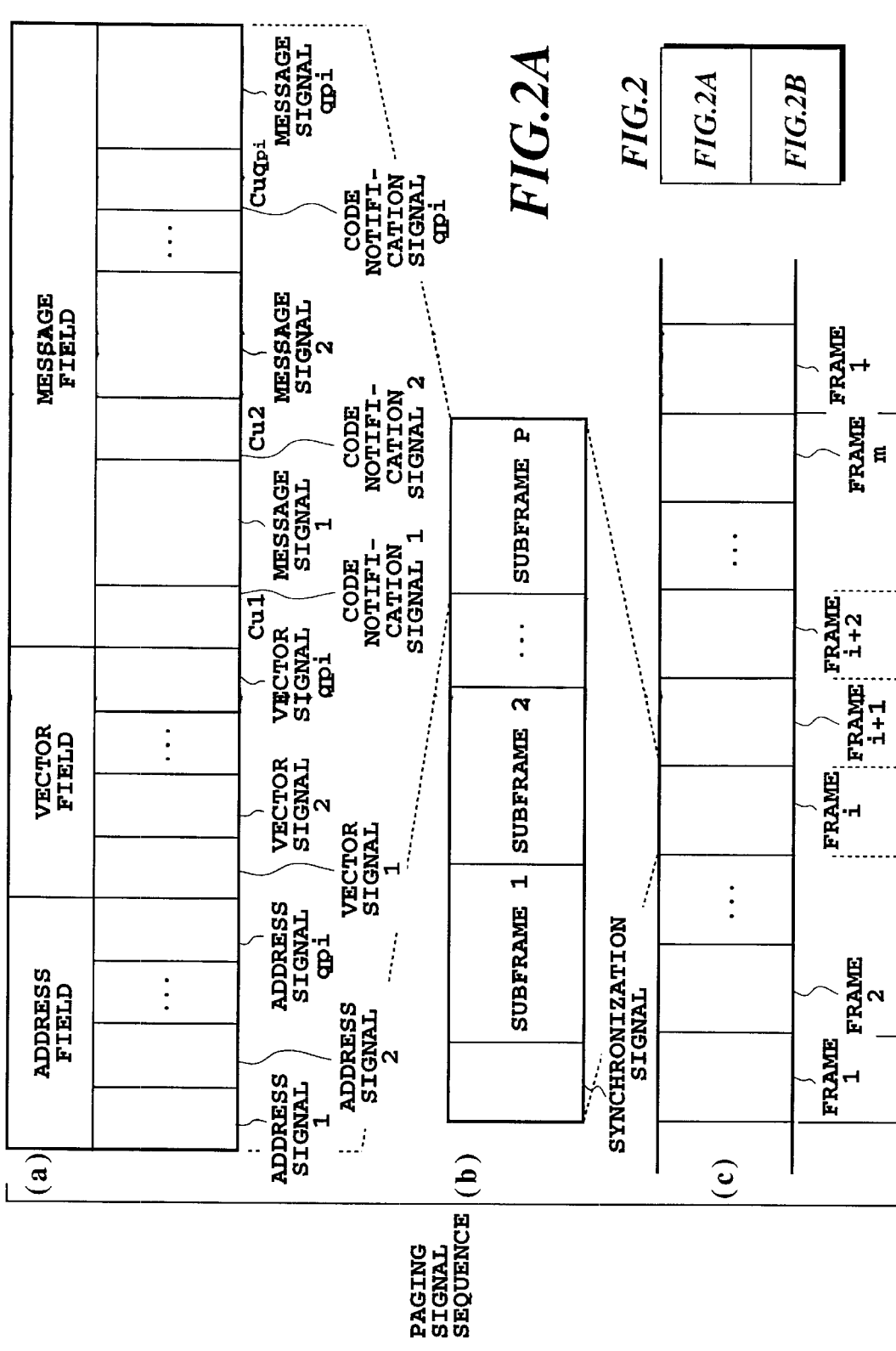

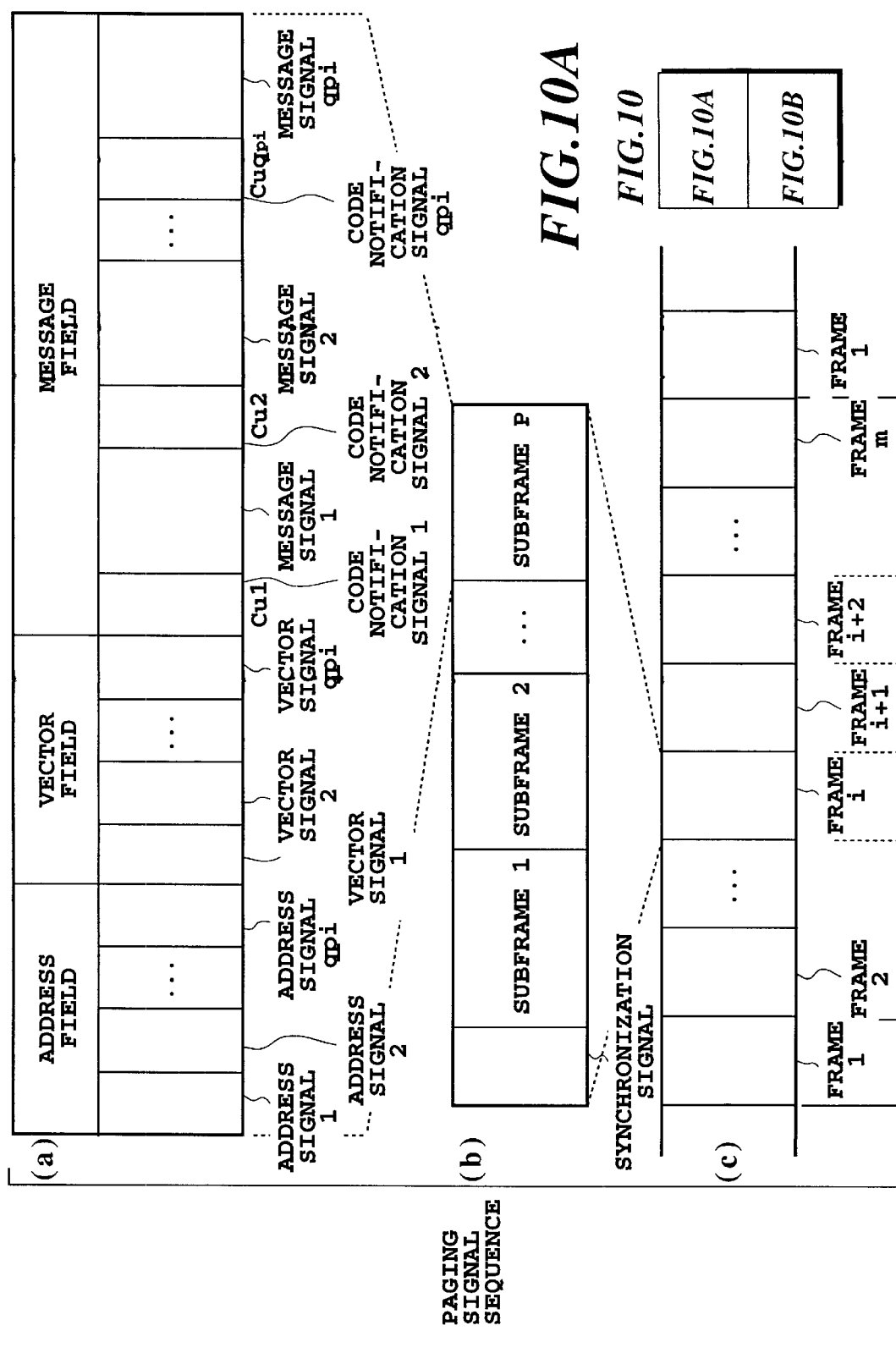

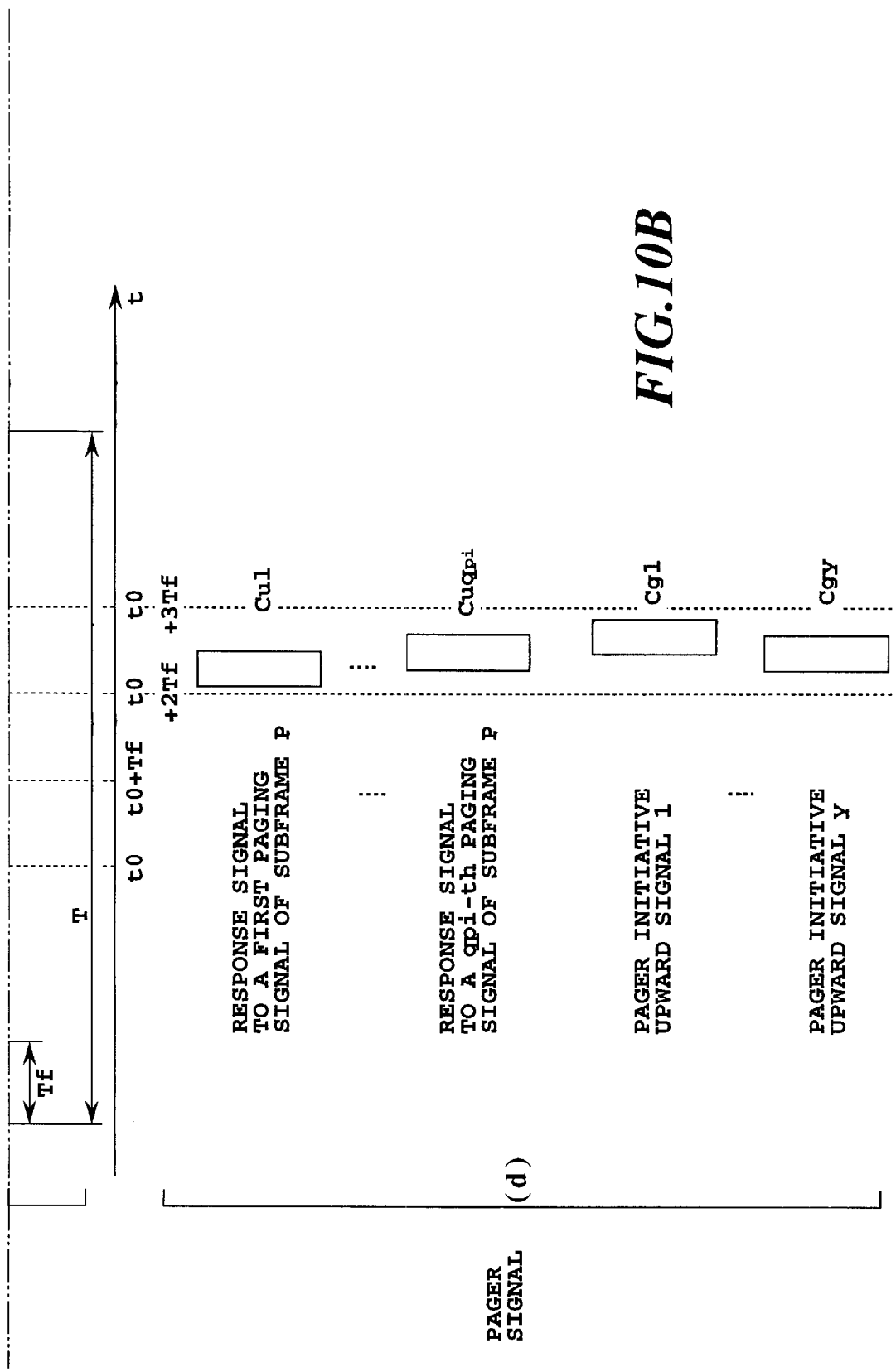

RADIO PAGING SYSTEM

TECHNICAL FIELD

The present invention relates to a two-way paging system capable of calling users carrying pagers by radio, and allowing them to send messages from their pagers to base stations. In the following description, a signal from a pager to a base station is referred to as an "upward signal".

BACKGROUND ART

FIG. 1 is a block diagram showing a two-way paging system, which applies a direct sequence spread spectrum scheme to transmit upward signals from pagers to base stations. The paging system comprises a central station 3 connected to a communications network 2; a plurality of (n) base stations 7-1–7-n connected to the central station 3; and pagers 8-1 and 8-2 capable of carrying out radio communications with the base stations 7-1–7-n.

The central station 3 comprises an accepting unit 10, encoder 11, spreading code assigner 12 and line terminal unit 13. The accepting unit 10 is connected to the communications network 2, receives paging request signals from the communications network 2, and supplies them to the encoder 11. The encoder 11 converts the paging request signals and code notification signals into paging signal sequences. The code notification signals are output from the spreading code assigner 12 to notify the pagers of spreading codes for the upward signals. The line terminal unit 13 delivers the paging signal sequences to corresponding base stations. The line terminal unit 13 also receives the upward signals sent from the pagers through the base stations, collects them, and supplies them to the accepting unit 10. Thus, the accepting unit 10 notifies the telephone 1 or computer terminal 9 of a paging response through the communications network 2.

The base stations 7-1–7-n each comprise a line terminal unit 20, transmitter 21, spreading code memory 25 and receiver 24. The line terminal unit 20 receives the paging signal sequences from the central station 3, and transfers them to the transmitter 21. The transmitter 21 converts them to radio signals (electromagnetic waves), and transmits them at a frequency F1. The receiver 24 in each of the base stations 7-1–7-n receives the upward signals from the called pagers that are detecting the paging signals addressed thereto. The receiver 24 uses a plurality of spreading codes prestored in the spreading code memory 25 for despreading these upward signals. The received upward signals are transmitted through the line terminal unit 20 to the central station 3, so that it sends the response information to the telephone 1 or computer terminal 9 via the communications network 2.

Next, the operation will be described for paging the pager 8-1 or 8-2 from the fixed telephone 1 or computer terminal 9. The user inputs to the telephone 1 or computer terminal 9 the called number of the pager 8-1 or 8-2, and a message if there is any. The input information is sent to the central station 3 through the communications network 2 as a paging request signal. In the central station 3, the encoder 11 converts into the paging signal sequence the paging request signal from the accepting unit 10 and the code notification signal supplied from the spreading code assigner 12 to notify the called pager of the spreading code. The line terminal unit 13 transmits it to the base stations 7-1–7-n. The base stations 7-1–7-n each convert it to a radio signal (electromagnetic wave), and transmit it simultaneously to their own radio zones 5-1–5-n at the same frequency F1. The pagers 8-1 and 8-2 each receive the radio signal at the predetermined frequency F1, and informs the user of the pager when they detect the paging signal calling them. After that, the pager 8-1 or 8-2 sends to the base stations a paging response it produces by the direct sequence spread spectrum modulation using the spreading code that is defined by the code notification signal received in conjunction with the paging signal. The base station in the radio zone in which the pager is located despreads the upward signal using the spreading code prestored in the spreading code memory 25, and transmits it to the central station 3 (in the example as shown in FIG. 1, the base station 7-1 receives the upward signal transmitted from the pager 8-1, and the base station 7-2 receives the upward signal transmitted from the pager 8-2). Thus, the central station 3 notifies the telephone 1 or computer terminal 9 via the communications network 2 that the pager accepts the call.

FIG. 2 illustrates a structure of the paging signal sequence sent from the base stations. The paging signal sequence is based on the signal structure shown in the RCR STD-43 standard worked out by Association of Radio Industries and Businesses in Japan. In this signal structure, the paging signal sequence consists of frame sequences each of which includes m successive frames as shown in FIG. 2($a$). Each frame has a signal length of Tf, and consists of a synchronization signal and p subframes as shown in FIG. 2($b$) which illustrates the i-th frame ($1 \leq i \leq m$) as an example, which will be called "frame i" from now on. Here, p represents the number of times of transmissions of the same paging signal. Each subframe of the frame i includes an address field, vector field and message field: The address field consists of $q_{ji}$ ($1 \leq j \leq p$) address signals; the vector field consists of $q_{ji}$ vector signals corresponding to the address signals; and the message field consists of $q_{ji}$ message signals corresponding to the address signals as shown in FIG. 2($c$) which illustrates the p-th subframe. A vector signal k ($1 \leq k \leq q_{ji}$) indicates the start point and end point of a message signal k corresponding to an address signal k. With such a signal structure, the code notification signal is affixed to an initial position of each message signal in the message field.

Thus, the subframe p in the frame i in the paging signal sequence has $q_{pi}$ paging signals inserted thereinto, wherein k-th ($1 \leq k \leq q_{pi}$) paging signal is provided with the code notification signal Cuk indicative of the spreading code used for generating the upward signal by the direct sequence spread spectrum modulation. When the pager, to which the frame i is assigned to be received, detects its own paging signal in the frame i during the transmission period Tf beginning from time t0, it starts to transmit the response upward signal corresponding to the paging signal from time t0+Tf at the earliest. FIG. 2($d$) illustrates an example in which it transmits the upward signal during time t0+2Tf–t0+3Tf considering the processing delay and the like required for receiving and transmitting the signal.

FIG. 3 is a block diagram illustrating a configuration of the pager. It comprises a receiver 30, controller 31, speaker 32, driver 33, display 34 and transmitter 35. The transmitter 35 is a direct sequence spread spectrum modulation transmitter. The receiver 30 is brought into a receiving state only during a receiving period of one or more preassigned frames among the paging signal sequences transmitted from the base station, and receives the frames. This technique, which is called an intermittent receiving method, can prolong the life of the battery of the pager. The controller 31 checks whether its own paging signal is present or not in the received frame, and notifies, if it is detected, the user that a call takes place, by a beep from the speaker 32 or some other alarms. If the paging signal includes a message, the controller 31 displays it on the display 34 via the driver 33. Then, the controller 31 supplies the transmitter 35 with a response upward signal corresponding to its own paging signal detected, together with a spreading code uniquely determined by the code notification signal contained in the paging signal. The transmitter 35 carries out, using the spreading code fed from the controller 31, the direct sequence spread spectrum modulation of the upward signal which is also fed from the controller 31, and transmits it to the base station. In this case, the frequency Fb for transmitting the upward signal is uniquely predetermined from the frequency Fl for receiving the paging signal.

FIG. 4 illustrates an example of the upward signal composed of the synchronization signal, pager ID (identification) signal and response information acknowledging reception of the paging signal.

If two pagers, which receive the same forward signal frequency Fl, receive paging signals transmitted in the same frame, they will simultaneously transmit their upward signals using the same frequency Fb. If the two pagers belong to different radio zones as shown in FIG. 1, the two upward signals will be received without collision. In contrast with this, the upward signal from the pager 8-2 can collide with that from the pager 8-1, if it arrives at the base station 7-1 from the pager 8-2 located in the contiguous radio zone 5-2, or if it arrives at the base station 7-1 because the pager 8-2 moves to the radio zone 5-1 after receiving the paging signal sequence. Even in such a case, however, the upward signals can be received distinctly because the spreading codes determined by the code notification signals differ from each other, and are all known by the base station 7-1 because they are prestored in the spreading code memory 25.

DISCLOSURE OF THE INVENTION

The pager with the function to transmit the upward signal is applicable not only to respond to the paging signal, but also to transmit information to another pager or a telephone or computer connected to the communications network, or to transmit information for its location registration. Such transmitting operation of the pager other than transmitting the response upward signal is referred to as "pager initiative" from now on.

An object of the present invention is to provide a two-way paging system enabling the base station to receive the response upward signal acknowledging reception of the paging signal, and the pager initiative upward signal, independently.

There is provided a paging system having one or more base stations for transmitting to a radio zone a paging signal sequence, and one or more pagers for receiving at least one paging signal of the paging signal sequence transmitted from the one or more base stations, the pagers each comprising:
response means for transmitting, when the paging signal sequence received includes a paging signal addressed to the pager, a response signal acknowledging reception of the paging signal, through direct sequence spread spectrum modulation; and
initiative transmission means for transmitting a pager initiative signal through direct sequence spread spectrum modulation using a spreading code different from that used by the response means, and the base stations each comprising:
receiving means for receiving, from the response means and the initiative transmission means of the pagers, signals that undergo the direct sequence spread spectrum modulation.

According to the present invention, different spreading codes are assigned to the response upward signal acknowledging the reception of the paging signal and to the pager initiative upward signal. This enables the base station to receive the two types of upward signals independently even if they collide with each other, thereby improving their transmission quality.

Here, the paging signal sequence transmitted from the base stations may include information designating a spreading code used for transmitting the response signal;

each of the pagers may further comprise code detection means for detecting from the paging signal sequence the spreading code designated; and the response means of the pager may carry out the direct sequence spread spectrum modulation using the spreading code the code detection means detects.

The pagers may comprise a spreading code memory for storing a second group of spreading codes different from a first group of spreading codes used by the response means; and the initiative transmission means may carry out initiative transmission by selecting a spreading code from the spreading code memory.

The pagers may comprise a spreading code memory; and the initiative transmission means may carry out an initiative transmission by selecting from the spreading code memory a spreading code other than the spreading code the code detection means detects.

The base stations may further comprise a spreading code memory that stores entire spreading codes used; and the receiving means may receive signals from the response means and the initiative transmission means in each of the pagers by using the spreading code memory.

The base stations may further comprise a memory for storing the spreading codes designated for the pagers, and a spreading code memory that stores the second group of the spreading codes; and the receiving means may receive, using the memory and the spreading code memory, signals from the response means and the initiative transmission means in the pagers.

The base stations may further comprise a memory for storing spreading codes designated for the pagers, and a spreading code memory that stores entire spreading codes use; and the receiving means may receive, using spreading codes from the memory and spreading codes from the spreading code memory excluding those stored in the memory, the signals from the response means and the initiative transmission means in each of the pagers.

The spreading codes used by the initiative transmission means may be selected at random.

The initiative transmission means may transmit, as its transmitting signal, at least one of a reply to a message from a user and a location registration signal.

BRIEF DESCRIPTION OF THE DRAWINGS

FIG. 1 is a block diagram showing a conventional two-way paging system;

FIG. 10 is a diagram illustrating the transmission timings of a pager initiative upward signal and an upward signal acknowledging reception of a paging signal in conjunction with the receiving timings of the paging signal;

BEST MODE FOR CARRYING OUT THE INVENTION

Embodiment 1

Figure 5:
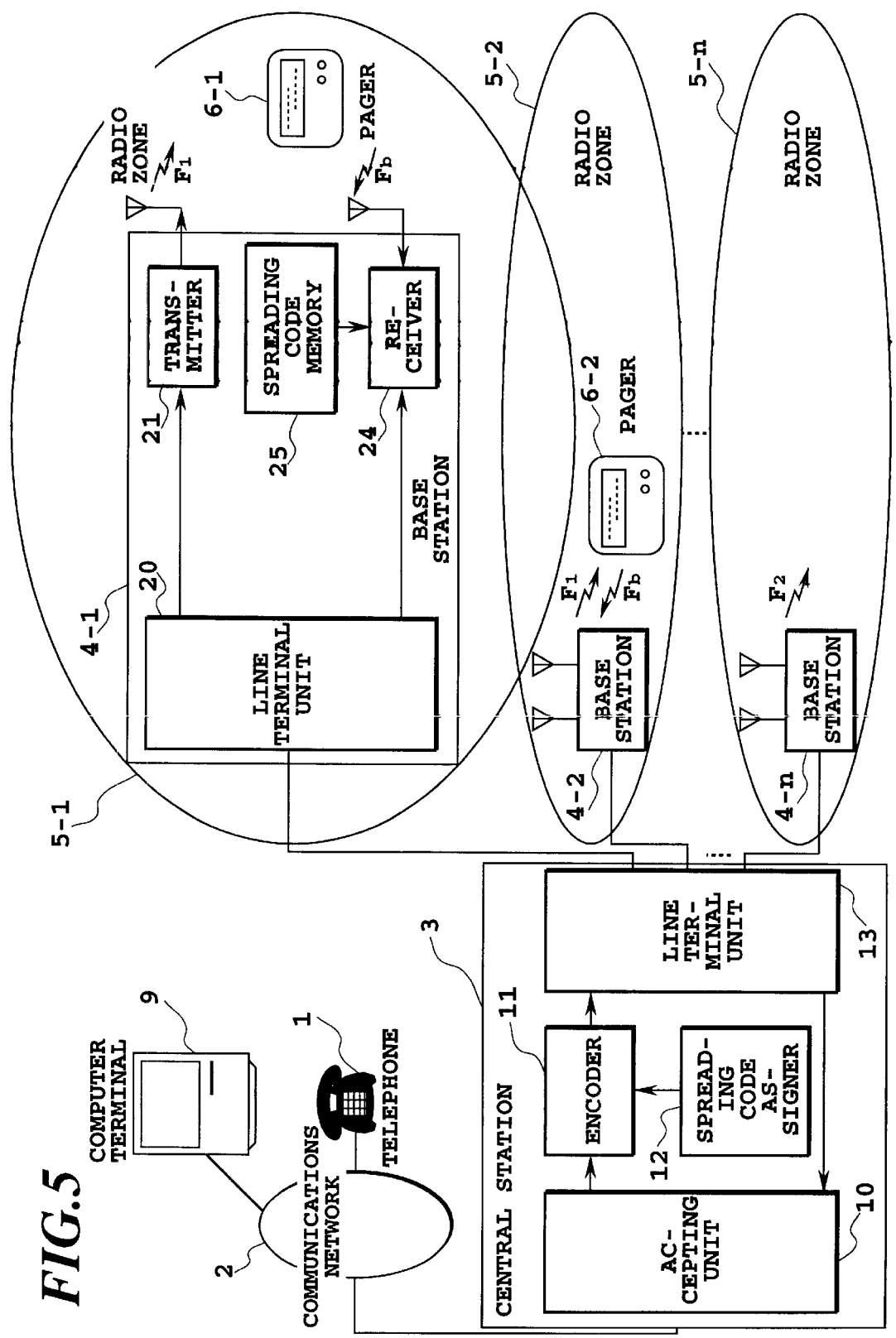
FIG. 5 is a block diagram showing a paging system in accordance with the present invention.
Figure 6:
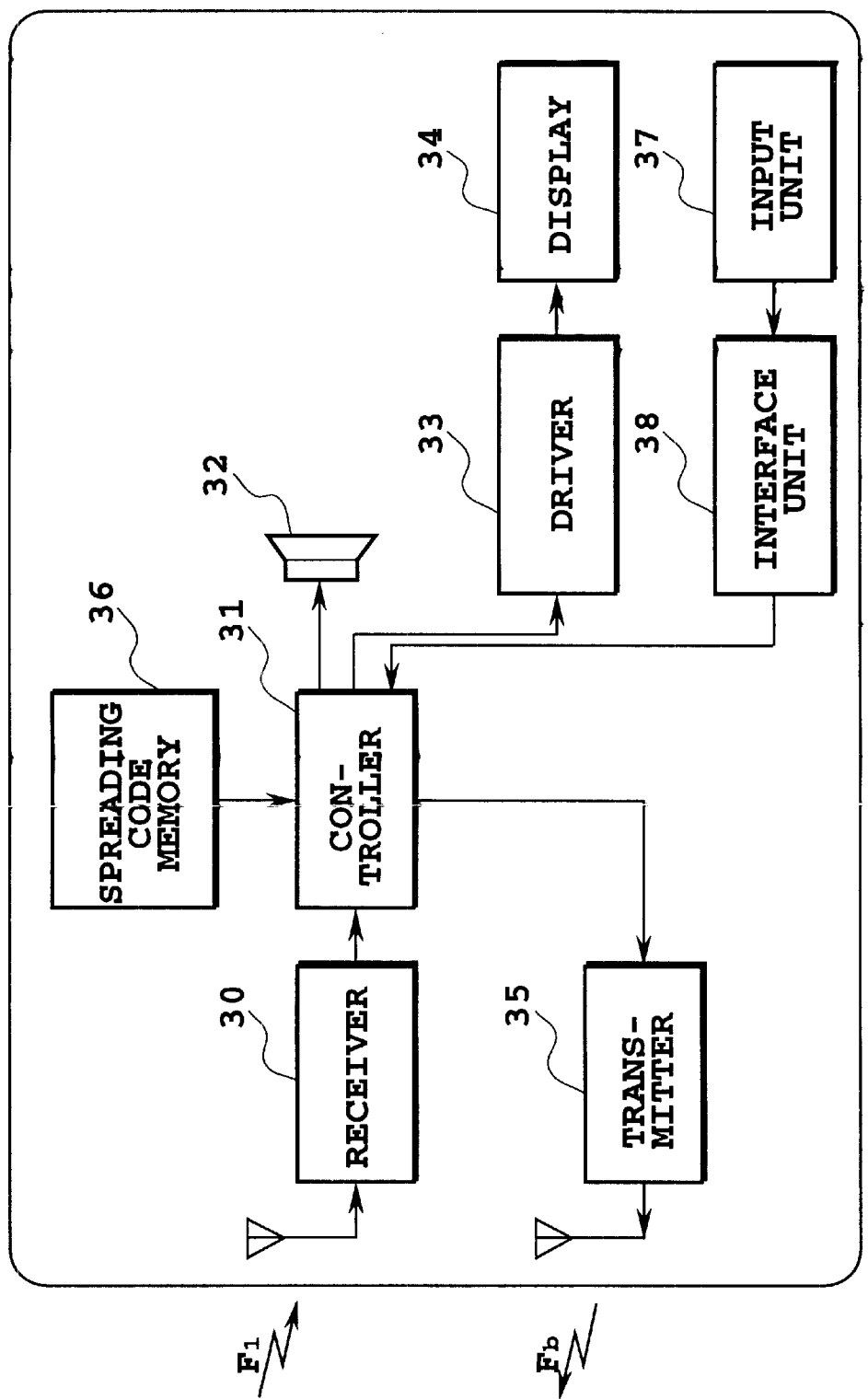
FIG. 6 is a block diagram showing a configuration of a pager.

FIG. 5 is a block diagram showing a paging system in accordance with the present invention, and FIG. 6 is a block diagram showing a configuration of a pager. The paging system comprises a central station 3 for generating paging signal sequences to be delivered; one or more base stations 4-1–4-n for transmitting the delivered paging signal sequences to radio zones, and pagers 6-1 and 6-2 for receiving at least one paging signal in the paging signal sequences transmitted from the base stations 4-1–4-n.

The central station 3 comprises an accepting unit 10, encoder 11, spreading code assigner 12 and line terminal unit 13. In the central station 3, the spreading code assigner 12 assigns spreading codes by selecting them from a group of spreading codes for transmitting response upward signals which will be described later.

The base stations 4 each comprise a line terminal unit 20, transmitter 21, receiver 24 and spreading code memory 25 as in the conventional system as shown in FIG. 1. To receive the above mentioned pager initiative signals by the receiver 24, the spreading code memory 25 stores not only the spreading codes for the response upward signals corresponding to the paging signals, but also the spreading codes for the pager initiative upward signals.

The pager 6-1 or 6-2 as shown in FIG. 6 comprises as the conventional one a receiver 30, controller 31, speaker 32, driver 33, display 34, transmitter 35, and spreading code memory 36 for independently managing the group of the spreading codes for transmitting the response upward signal, and that for transmitting the pager initiative upward signal. In addition, it comprises an input unit 37 for inputting responses to messages or the like, and an interface unit 38 for delivering the information from the input unit 37 to the controller 31.

With the foregoing arrangement, the pager 6-1 and 6-2 can each transmit, through the direct sequence spread spectrum modulation, the response upward signals, which acknowledge that the pagers receive the paging signals address to them when the received paging signals include them, and the pager initiative upward signals, which are sent using spreading codes different from those associated with the response upward signals. More specifically, the spreading code memory 36 in each pager manages the spreading codes to be used in the direct sequence spread spectrum modulation carried out by the transmitter 35, by dividing them into two groups in advance. The controller 31 selects, when transmitting the response upward signal, the spreading code to be used by the transmitter 35 from a first group sent from the base station, and selects, when transmitting the pager initiative upward signal, from a second group of the two groups stored in the spreading code memory 36.

Figure 7:
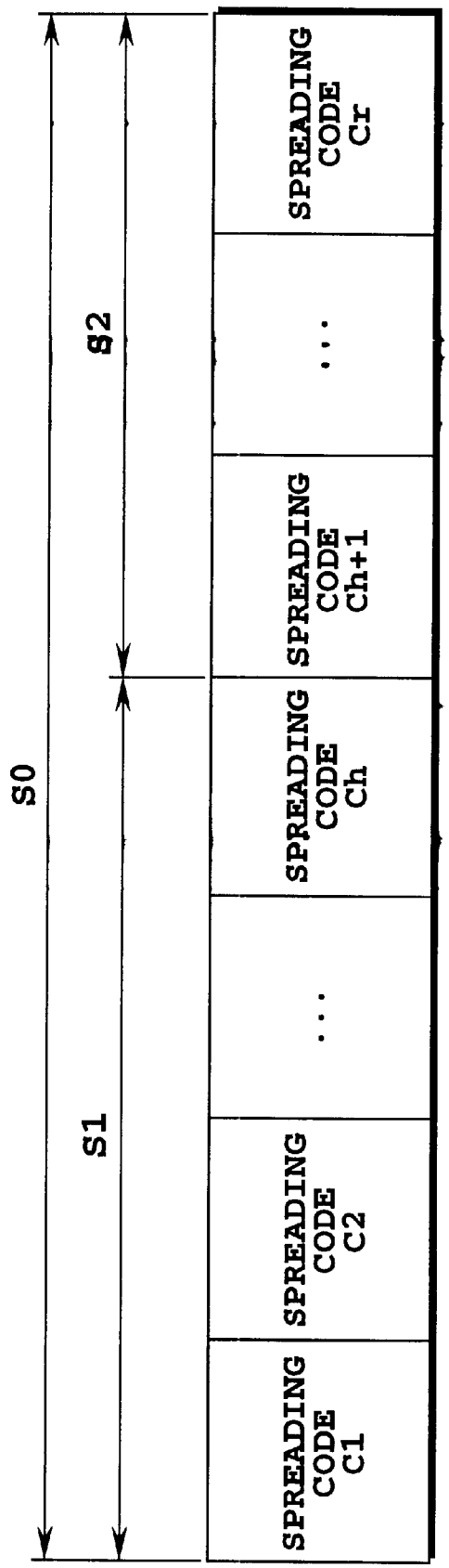
FIG. 7 is a diagram illustrating an assignment example of spreading codes.

FIG. 7 illustrates an example of the assignment of the spreading codes, in which r spreading codes available for the direct sequence spread spectrum modulation are divided into two groups S1 and S2. The group S1 includes h (0<h<r) spreading codes, and the group S2 includes the remaining r–h spreading codes. Assuming that Gold code sequences are applied, and that the M-sequence for generating them has a period of $2k-1$, the sum total of $2k+1$ spreading codes are present, which means that $r=2k+1$ (see, Yamauchi, "Spread spectrum communications—for the next generation high performance communications—", Tokyo Denki university, 1994). The pager selects, when transmitting the response upward signals which acknowledge reception of the paging signal, the spreading codes from the group S1 for carrying out the direct sequence spread spectrum modulation, whereas it selects them from the group S2 for carrying out the direct sequence spread spectrum modulation of the pager initiative upward signal. This makes it possible to prevent the same spreading code from being used for modulating the two types of the upward signals.

The operation for assigning the spreading codes will now be described with reference to the flowcharts of FIGS. 8 and 9. It is assumed in the configuration shown in FIGS. 5 and 6 that the spreading codes in the group S1 are used to be assigned by the assigner 12 in the central station 3, whereas the spreading codes in the group S2 are used for transmitting and receiving the pager initiative upward signal by storing them in advance in the spreading code memory 36 in each of the pagers 6-1 and 6-2, and in the spreading code memory 25 in each of the base stations 4-1–4-n.

Figure 8:
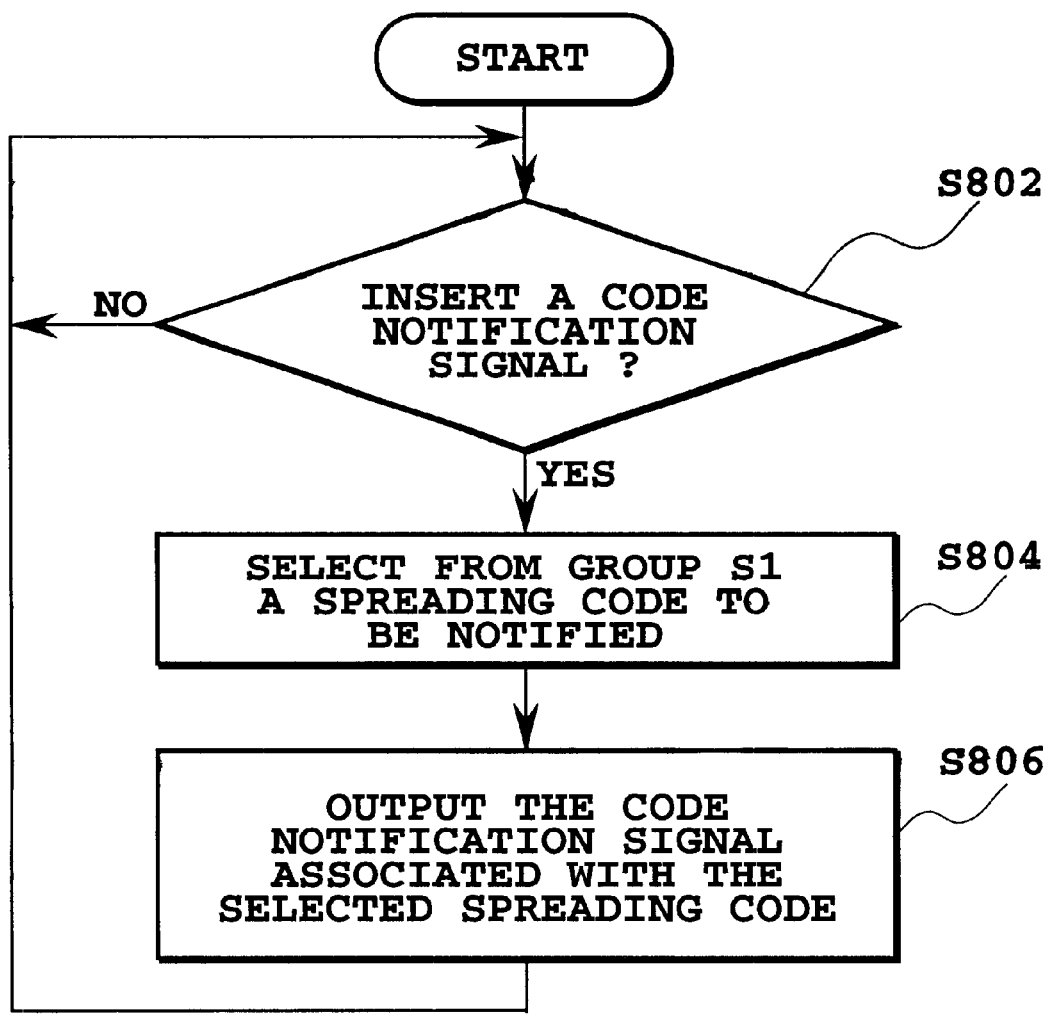
FIG. 8 is a flowchart illustrating the operation of a spreading code assigner.

With reference to the flowchart of FIG. 8 illustrating the operation of the spreading code assigner 12 in the central station 3, when inserting the code notification signal ("YES" at S802), the spreading code assigner 12 selects from the group S1 of FIG. 7 the spreading code to be notified (S804). The spreading code is selected such that it becomes unique in the same group (that is, in the same frame) of the target pagers (but it can be not unique between frames). Then, the spreading code assigner 12 outputs the code notification signal corresponding to the selected spreading code (S806). The code notification signal is encoded by the encoder 11 together with the message, and is transmitted to the base stations 4-1–4-n.

The base stations 4-1–4-n transfer the received encoded signal to the pagers through the transmitter 21.

Figure 9:
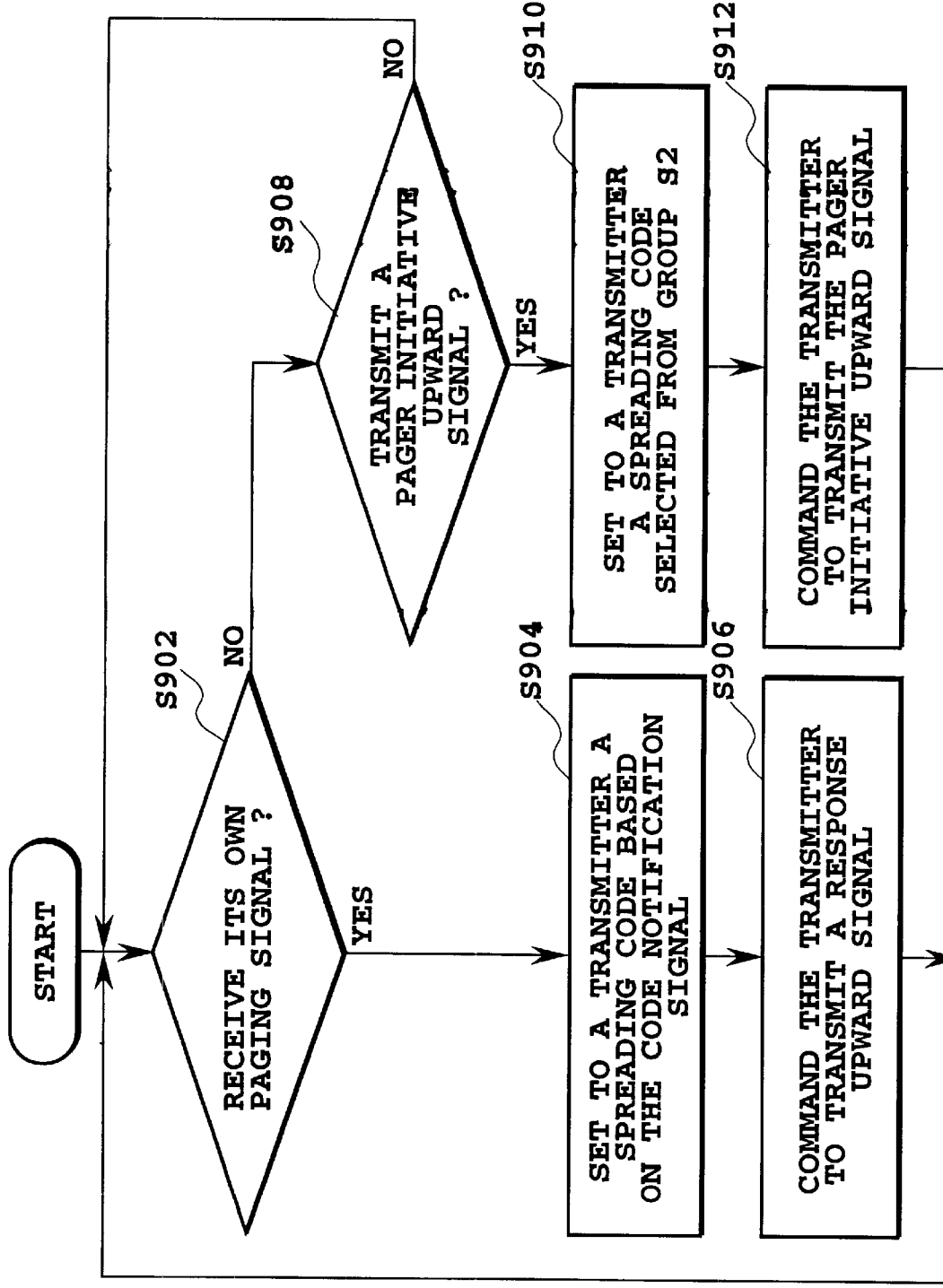
FIG. 9 is a flowchart illustrating the operation of a controller.

With reference to the flowchart of FIG. 9 illustrating the operation of the controller 31 of the pagers 6-1 and 6-2, when transmitting the response upward signal acknowledging reception of the paging signal ("YES" at S902) after receiving it, the controller 31 sets to the transmitter 35 the spreading code obtained from the information affixed to the paging signal addressed thereto, that is, the one the spreading code assigner 12 assigns in the central station 3 (S904). In contrast with this, when transmitting the pager initiative upward signal ("YES" at S908), it sets the spreading code selected from the group S2 of FIG. 7, which is stored in the spreading code memory 36 (S910). Then, it commands the transmitter 35 to transmit the upward signal (S912).

The receiver 24 in each base station 4-1–4-n receives the response upward signal using the spreading codes in the group S1 stored in the spreading code memory 25, and the pager initiative upward signal using the spreading codes in the group S2 which are also stored in the spreading code memory 25.

Thus assigning the spreading codes makes it possible for the response upward signal sent from the pagers 6-1 and 6-2 for acknowledging the reception of the paging signal, and for the upward signal sent on the initiative of the pagers 6-1 and 6-2, to use different spreading codes so that the receiver 24 can distinguish these upward signals. Thus, the upward signals can be transmitted without corrupting the transmission quality.

Figure 2B:
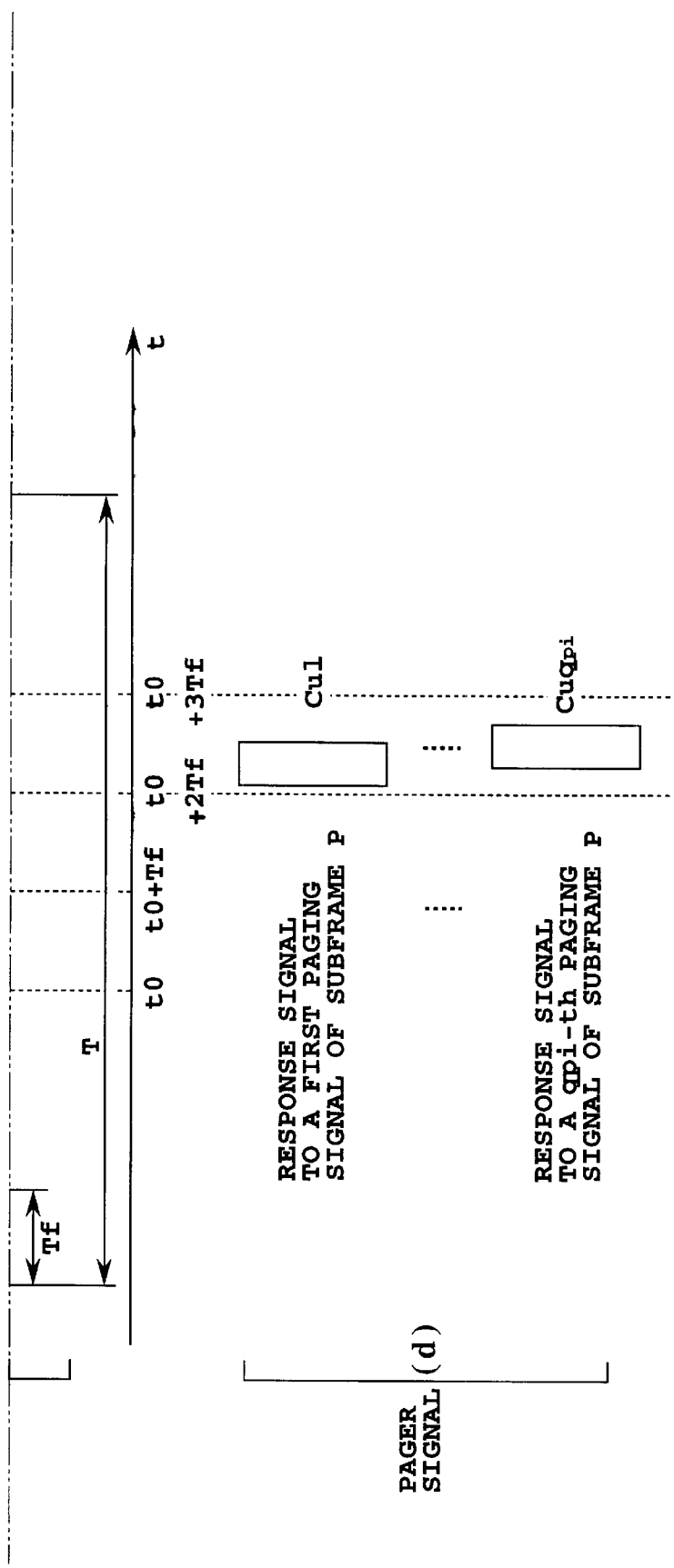
FIG. 2 is a diagram showing a structure of a paging signal sequence transmitted from a base station.
Figure 3:
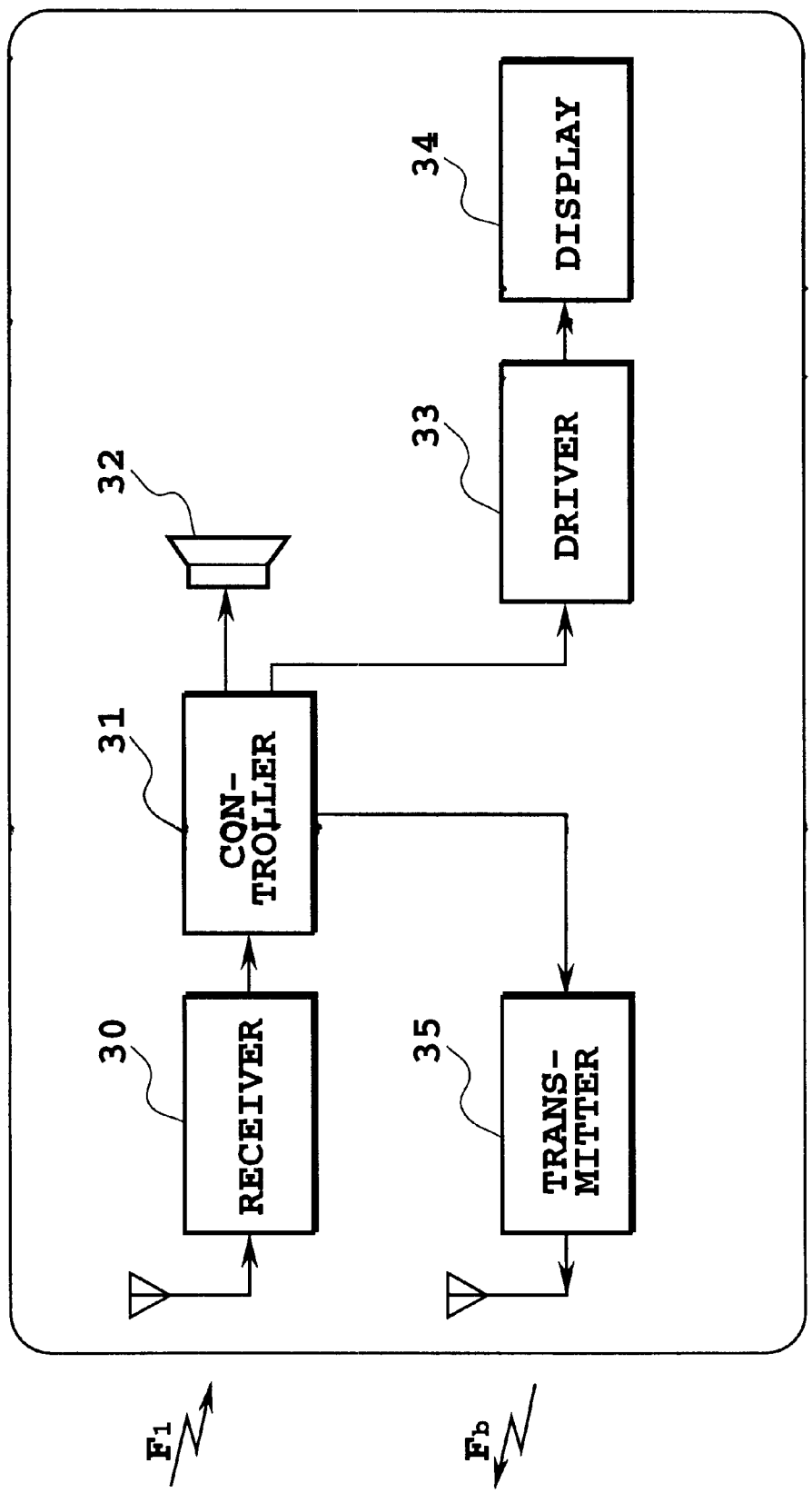
FIG. 3 is a block diagram showing an example of a pager.
Figure 4:
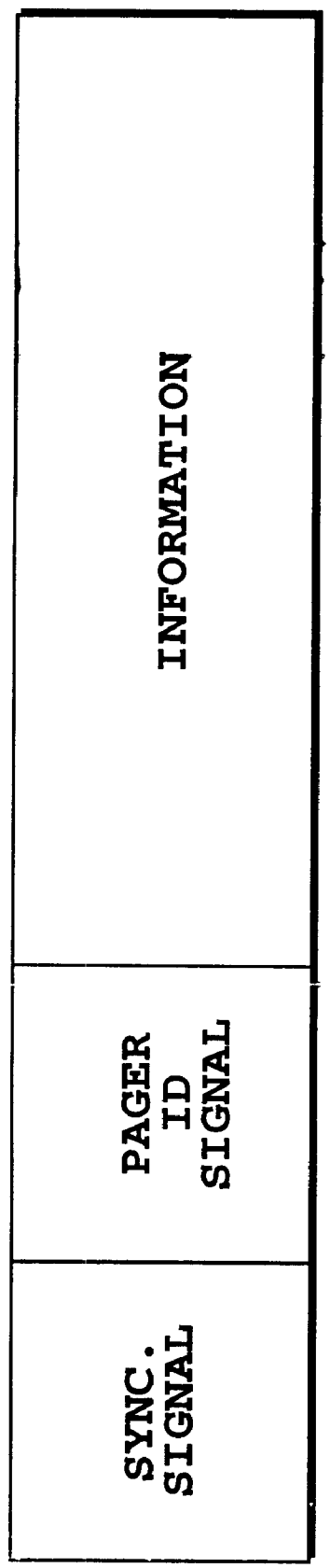
FIG. 4 is a diagram illustrating a structure of an upward signal.

FIG. 10 illustrates transmitting timings of the upward signals transmitted on the initiative of the pagers, and those of the upward signals in response to the paging signal, in conjunction with the receiving timings of the paging signals. As in FIG. 2, it is assumed here that the subframe p in the frame i in the paging signal sequence includes qpi paging signals inserted thereinto, wherein k-th ($1 \leq k \leq qpi$) paging signal is provided with the code notification signal k indicative of the spreading code Cuk used for generating the direct sequence spread spectrum modulation upward signal. The response upward signals for the paging signals are the same as those of FIG. 2. FIG. 10 illustrates the case where y pager initiative upward signals are transmitted from time t0+2Tf to t0+3Tf. They do not use spreading codes selected from the group of Cuk, but use spreading codes selected from the group S2, which are denoted as Cgl ($1 \leq l \leq y$).

If multiple upward signals are transmitted at the same timing on the initiative of the pagers as shown in FIG. 10, each pager can generate a random signal, and assign the spreading code based on the random signal to reduce the probability of using the same spreading code for the upward signal, or can assign the spreading code obtained from the random signal and its own address. Furthermore, when the base stations each insert in the paging signal sequence a base station identification signal which differs for each base station as disclosed in Japanese patent application No. 8-167471(1996), each pager can assign the spreading code obtained from the ID signal and the random signal, or that obtained from these plus its own address.

Figure 11A:
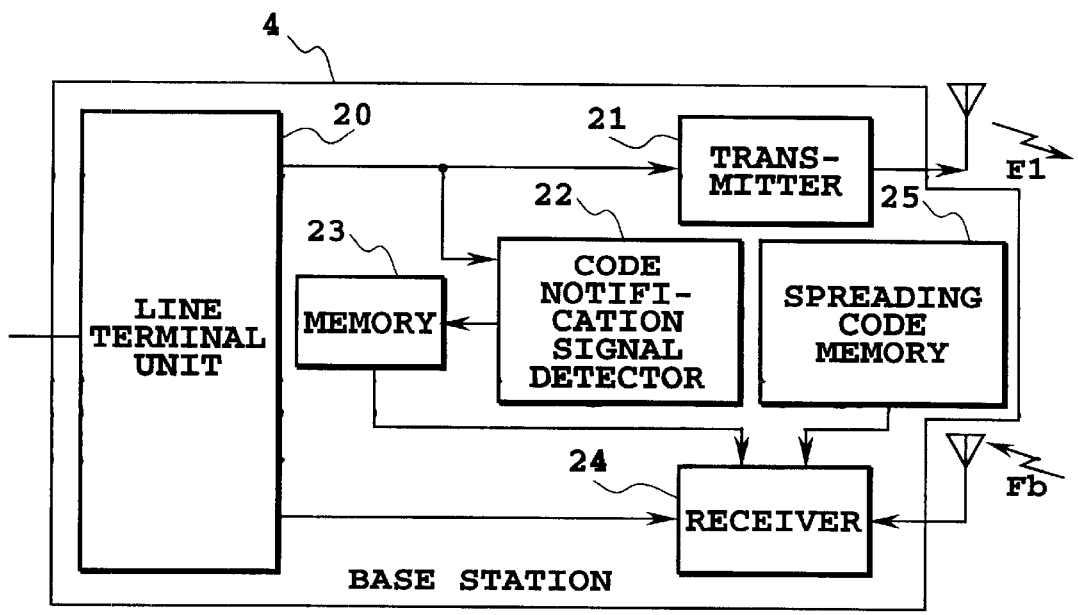
FIG. 11A is a block diagram showing a configuration of a base station.
Figure 11B:
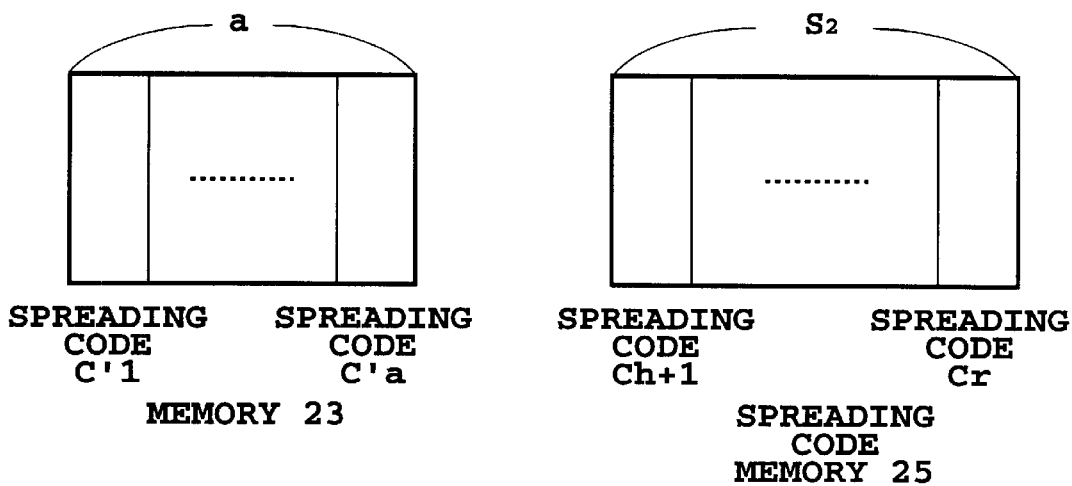
FIG. 11B is a diagram illustrating spreading codes in a memory 23 and spreading code memory 25.

FIG. 11 shows another configuration of the base station in the embodiment 1, wherein FIG. 11A is a block diagram showing the configuration of the base station 4, and FIG. 11B is a diagram illustrating the spreading codes stored in the memory 23 and spreading code memory 25 of FIG. 11A.

The base station 4 as shown in FIG. 11 comprises a line terminal unit 20, transmitter 21, code notification signal detector 22, memory 23, spreading code memory 25 and receiver 24. The line terminal unit 20, receiving the paging signal sequence from the central station 3, delivers it to the transmitter 21 and code notification signal detector 22. The code notification signal detector 22 detects from the supplied paging signal sequence the code notification signals, and stores them in the memory 23. The transmitter 21 converts the paging signal sequence into a radio signal, and transmits it at frequency F1. Thus, the memory 23 stores the spreading codes used for despreading the response signals from the pagers. The spreading code memory 25, on the other hand, prestores the group S2 of the spreading codes used for the pager initiative upward signals. FIG. 11B illustrate this. The memory 23 stores the sum total of a spreading codes C'1–C'a ($1 < a \leq h$) detected by the code notification signal detector 22, and the spreading code memory 25 stores in advance the group S2 of the spreading codes used for despreading the pager initiative upward signals.

In the base station 4, the receiver 24 receives the upward signals sent from the pagers using the memory 23 and spreading code memory 25: To receive the response upward signals, it uses the spreading codes stored in the memory 23, and to receive the pager initiative upward signals, it uses the spreading codes stored in the spreading code memory 25.

Although the ratio between the numbers of the spreading codes in the groups S1 and S2 is fixed in the foregoing example, and the spreading code memories 25 and 36 store the spreading codes different from those assigned by the spreading code assigner 12, they can store the same spreading codes, and the ratio of the numbers of the spreading codes stored in the groups S1 and S2 can be varied from frame to frame that transmit the upward signals.

Embodiment 2

The foregoing embodiment has a dividing loss involved in separating the available spreading codes into the two groups. For example, when the traffic of the response upward signals the pagers transmit to acknowledge the paging signals is large, and that of the pager initiative upward signals is small, a case can take place that the spreading codes to be assigned to the response upward signals lack, although those to be assigned to the pager initiative upward signals are left unused, thereby preventing effective use of the spreading codes.

Figure 12:
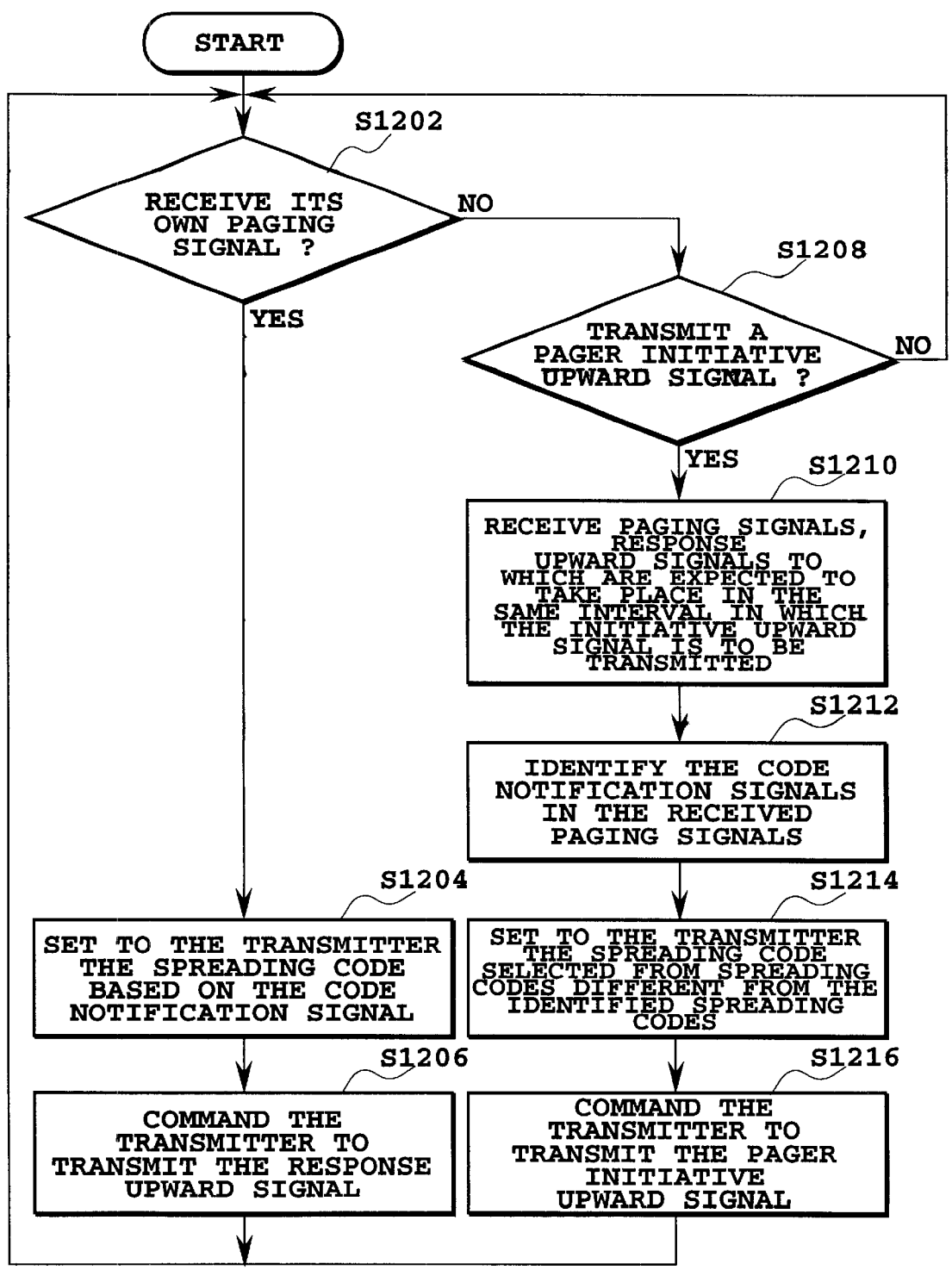
FIG. 12 is a flowchart illustrating control operation by a controller.

In view of this, it is preferable to use, as spreading codes to be assign to the pager initiative upward signals, spreading codes other than those designated by the information included in the received paging signals. More specifically, if there are r spreading codes that are available for the direct sequence spreading spectrum modulation in the configuration as shown in FIGS. 5 and 6, the spreading code assigner 12 in the central station 3 selects and assigns any one of the r spreading codes. In addition, these r spreading codes are all stored in the spreading code memory 25 of the base stations 4-1-4-n and in the spreading code memory 36 of the pagers 6-1 and 6-2 so that the spreading codes that are not assigned to the current frame by the spreading code assigner 12 can be used for transmitting or receiving the pager initiative upward signal. This will be described with reference to FIG. 10. The spreading codes, which are used for the response upward signals acknowledging the reception of the paging signals from time t0+2Tf to t0+3Tf, are Cu1, Cu2, Cuqpi. Accordingly, the pagers that transmit the pager initiative upward signals in the same interval receive the paging signals from time t0 to t0+Tf, recognize the spreading codes (Cu1, Cu2, . . . , Cuqpi), and assign only the spreading codes which differ from the recognized spreading codes and are selected from those available for the direct sequence spread spectrum modulation. FIG. 12 illustrates the control flow by the controller 31 in each pager.

In FIG. 12, when the pager receives the paging signal addressed thereto ("YES" at S1202), it sets to the transmitter 35 the spreading code based on the code notification signal added to the received message (S1204), and sends from the transmitter 35 the response upward signal that undergoes the direct sequence spread spectrum modulation using the set spreading code (S1206). The operation so far is the same as that of FIG. 9.

When transmitting the pager initiative upward signal ("YES" at S1208), the pager determines the interval to send it (frame i+2 as shown in FIG. 10, for example), and receives the paging signals (those in the frame i of FIG. 10) that will cause the response upward signals in the interval determined (S1210). Then, the pager recognizes the code notification signals in the received paging signals (S1212), selects, from among the spreading codes in the spreading code memory 36, a spreading code that differs from those recognized, and sets it to the transmitter 35. Then, it commands the transmitter 35 to transmit the pager initiative upward signal (S1206). Thus, the transmitter 35 transmits the signal generated through the direct sequence spread spectrum modulation using the spreading code.

The base stations can receive and despread the pager initiative upward signal using the spreading codes stored in the spreading code memory 25.

The foregoing spreading code assignment can apply different spreading codes to the response upward signals sent from the pagers 6-1 and 6-2 to acknowledge the reception of the paging signals, and to the pager initiative upward signals sent on the initiative of the pagers 6-1 and 6-2, thereby preventing the transmission quality of the upward signals from being degraded.

In this spreading code assignment, if multiple pager initiative upward signals occur in the same timing, a case can take place in which the same spreading code is used by a plurality of upward signals as in the embodiment 1. To reduce the probability of such a timing, each pager can generate a signal at random and assign the spreading code obtained from the random signal as in the embodiment 1, or assign the spreading code obtained from the random signal and the address of the pager. Alternatively, as disclosed in Japanese patent application No. 8-167471, which has not yet been published as of the application date of the present application, the pagers can assign, when the base stations each transmit different ID signals with inserting them in the paging signals, the spreading codes obtained from the ID signals and random signals, or those obtained from them plus the addresses of the pagers.

Figure 13A:
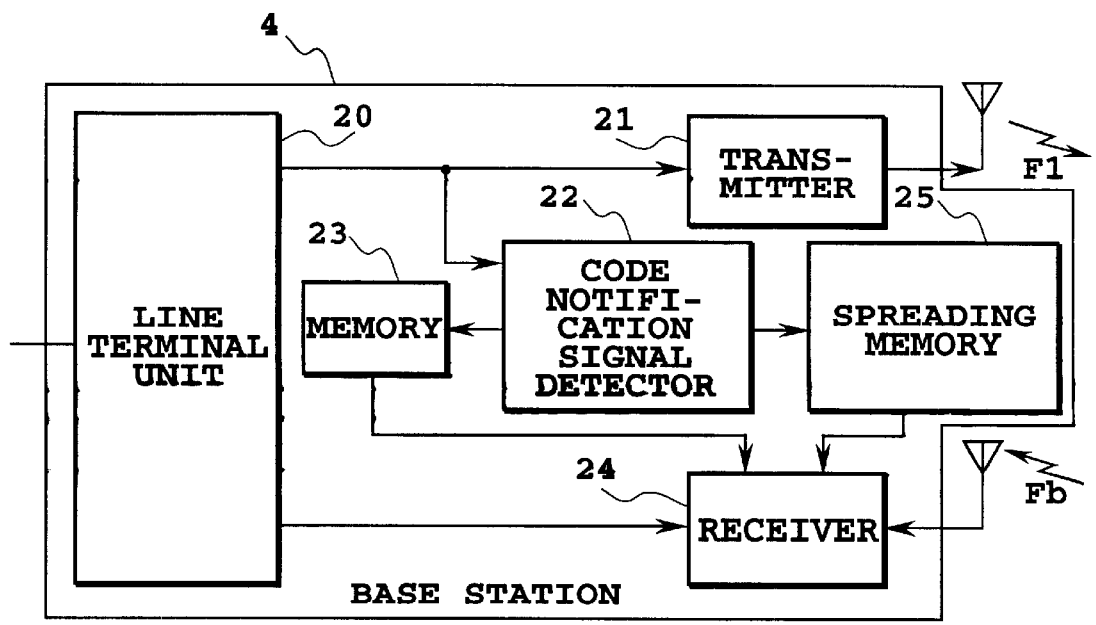
FIG. 13A is a block diagram showing another configuration of the base station.
Figure 13B:
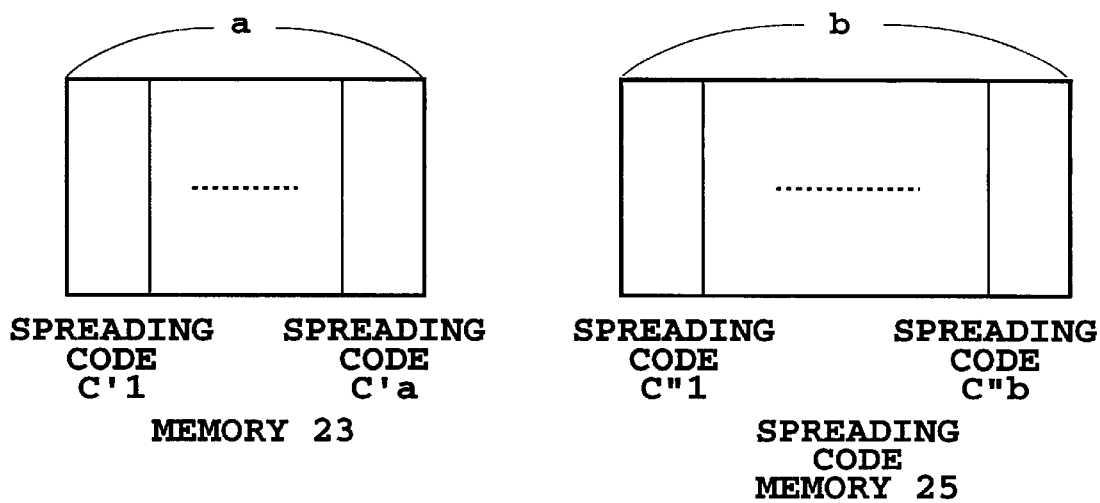
FIG. 13B is a diagram illustrating spreading codes in a memory 23 and spreading code memory 25.

FIG. 13 shows another configuration of the base station 4 in the embodiment 2, wherein FIG. 13A is a block diagram showing the configuration of the base station 4, and FIG. 13B is a diagram illustrating the spreading codes stored in the spreading code memory 25.

The base station 4 as shown in FIG. 13A comprises the line terminal unit 20, transmitter 21, code notification signal detector 22, memory 23, spreading code memory 25 and receiver 24. The line terminal unit 20, receiving the paging signal sequence from the central station 3, delivers it to the transmitter 21 and code notification signal detector 22. The code notification signal detector 22 detects from the supplied paging signal sequence the code notification signals, and stores the corresponding spreading codes in the memory 23. The spreading codes stored in the memory 23 are supplied to the receiver 24. The output of the code notification signal detector 22 is also delivered to the spreading code memory 25 that stores the entire spreading codes. The spreading code memory 25 can check the spreading codes fed from the code notification signal detector 22, and supply the receiver 24 with the spreading codes other than those fed from the code notification signal detector 22. The transmitter 21 converts the paging signal sequence into a radio signal, and transmits it at frequency F1.

FIG. 13B illustrates the spreading codes supplied to the receiver 24 from the memory 23 and spreading code memory 25. As shown in FIG. 13B, the memory 23 stores the total of a spreading codes $C'1$–$C'a$ detected by the code notification signal detector 22, and they are supplied to the receiver 24. Although the spreading code memory 25 stores the entire spreading codes used, those that are supplied to the receiver 24 are the total of b spreading codes $C''1$–$C''b$ excluding a spreading codes, where a+b=r.

In the base station 4, the receiver 24 receives the upward signals sent from the pagers using the spreading codes supplied from the memory 23 and spreading code memory 25: To receive the response upward signals, it uses the spreading codes supplied from the memory 23 which stores the total of a spreading codes for receiving the response upward signals as shown in FIG. 13B; and to receive the pager initiative upward signals, it uses the total of b spreading codes stored in the spreading code memory 25. Thus, since the base stations can each use different spreading codes in the reception, they can positively receive the response upward signals by precedently demodulating the response upward signals which are likely to receive more often.

[Pager Initiative Upward Signal]

The following are example of applying the pager initiative upward signals.

(1) A pager originating response message to a received message.

(2) A location registration of the pager. These signals will now be described in detail.

The response message here refers to a simple message the user of the pager sends in response to the received message. For example, reading the received message, the user sends such a response message as "finished reading" or "OK" in response to the received message such as "we would like to meet you at six at Tokyo international air port".

Next, the transmission of the pager for carrying out the location registration will be described. In FIG. 5, it is likely that service areas consist of the radio zones which have multiple frequencies F1 and F2, for example, and are operated independently. In this case, it is necessary for each pager to register to the accepting unit its current location. To achieve this, the pager initiative upward signal can be used.

In FIG. 5, let us assume that the pager 6-2 in the radio zone 5-2 moves to the radio zone 5-n having different frequencies, and that it can receive both the frequencies F1 and F2. The pager 6-2 measures which of the two frequencies is received better. If it decides that the frequency F2 is received better than F1 when it moves from the radio zone 5-2 to 5-n, it transmits to the base station 4-n a location registration request on its initiative. In response to this, the base station 4-n sends an acknowledgment of receiving the location registration request. From that time on, the central station 3 carries out the paging to the pager 6-2 through the area including the radio zone 5-n.

[Transmission Flow of the Pager Initiative Upward Signal]

A flow for carrying out the transmission of such a pager initiative upward signal will now be described with reference to FIG. 14.

Figure 14:
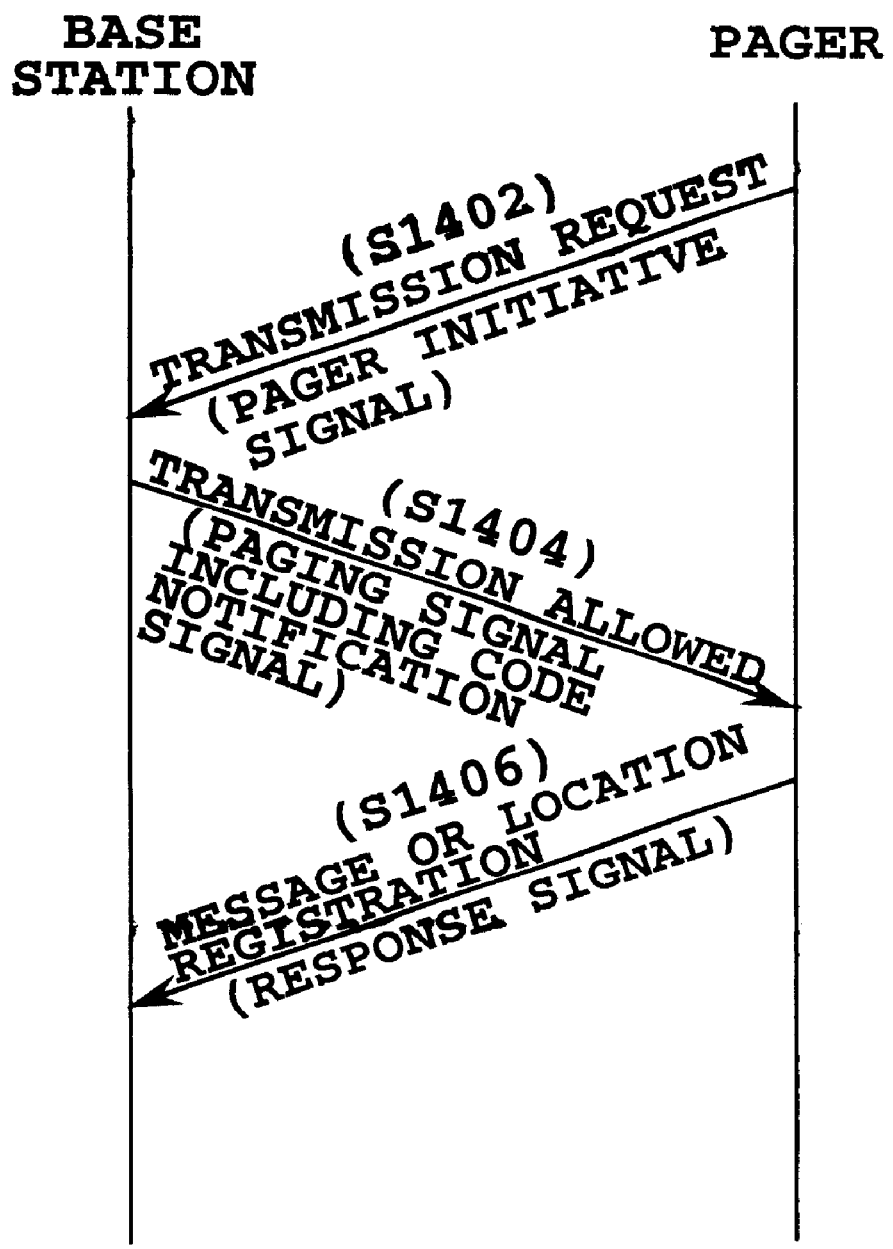
FIG. 14 is a diagram illustrating a sequence for transmitting the pager initiative upward signal.

In FIG. 14, when transmitting the upward signal from the pager, it sets a signal to be sent (like a message or location registration signal), and executes the transmission on the pager initiative. Thus, the controller 31 of the pager starts the transmission control. First, it transmits to the base station a transmission request (S1402). The transmission request signal is modulated using the spreading code selected by means of the above selection.

The base station, as in the normal message transmission, transmits to the pager the paging signal allowing the transmission, along with the code notification signal for notifying the spreading code to be used for responding (S1404). Receiving the transmission allowed signal, the pager transmits in response to it the message (or location registration signal) to be transmitted (S1406). The response signal undergoes direct sequence spread spectrum modulation using the spreading code designated by the code notification signal. The response signal also has the function of acknowledgment (ACK) in response to the transmission allowed signal sent from the base station.

[Another Transmission Flow of Pager Initiative Upward Signal]

Figure 15:
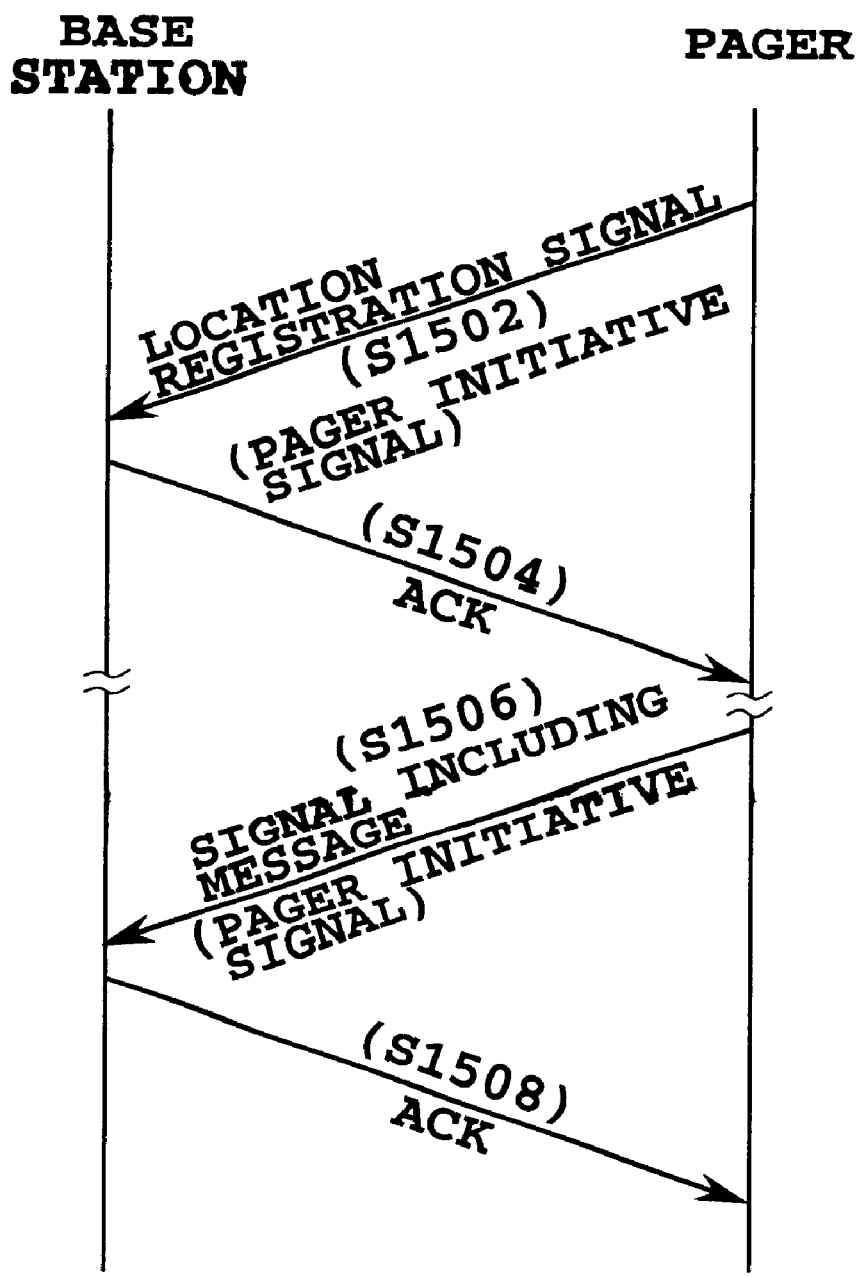
FIG. 15 is a diagram illustrating another sequence for transmitting the pager initiative upward signal.

Another transmission flow of another pager initiative upward signal will be described with reference to FIG. 15.

The pager, detecting that it moves into another zone by measuring at which frequency it can receive better, transmits the location registration request on its initiative (S1502). The transmission applies the spread spectrum modulation using the spreading code selected by the above-mentioned spreading code selection. Receiving it, the base station transmits a paging signal as an acknowledgment signal (ACK) indicative of receiving the location registration signal (S1504). From now on, the central station 3 carries out paging to the pager through the location registered radio zone.

The pager can also transmits a pager initiative message in a similar manner. Preparing the message, the pager transmits a signal including the message (S1506), which undergoes the spread spectrum modulation using the spreading code selected by the foregoing code selection. In response to this, the base station sends the paging signal as the acknowledgment signal indicative of receiving the message (S1508).

The pager initiative transmission carried out in this way can reduce the number of steps as compared with the transmission flow as shown in FIG. 14.

[Application of the Message From the Pager]

If the user of the pager can transmit a response message such as "finished reading", a user originating a message can receive a more positive reply. For example, the user of the pager can transmit the following reply in response to the inquiry of the user originating the message.

(1) If there is no response to the message: "In transmission now".

(2) If there is a response to the message, but the user of the pager has not yet transmitted the pager initiative message of reply: "Not yet finished reading".

(3) If there is a response to the message, and the user of the pager transmits the message such as "finished reading": "Already finished reading".

In this case, if there is any message to be sent together, it can also be transmitted at the same time.

To transmit the message, various methods can be taken. For example, it is possible not only to reply the inquiry, but also to transmit a response message, if there is any, to the party directly. The direct transmission can be achieved by means of voice, or text data such as electronic mail.

According to the present invention described above, the pager uses different spreading codes for carrying out direct sequence spread spectrum modulation of the response upward signal, which the pager sends to acknowledge the reception of the paging signal, and of the pager initiative upward signal. This enables the base station to receive them even if they collide with each other at receiving, thereby improving the transmission quality of the upward signals.

What is claimed is:

1. A paging system having one or more base stations for transmitting to a radio zone a paging signal sequence, and one or more pagers for receiving at least one paging signal of the paging signal sequence transmitted from the one or more base stations, said one or more pagers each comprising:

response means for direct sequence spread spectrum modulating, when the paging signal sequence received includes a paging signal addressed to the pager, a response upward signal acknowledging reception of the paging signal, and for transmitting the modulated response upward signal; and initiative transmission means for direct sequence spread spectrum modulating a pager initiative upward signal by using a second spreading code different from a first spreading code used by said response means, and for transmitting the modulated pager initiative upward signal, said pager initiative upward signal being an upward signal other than said response upward signal; and said one or more base stations each comprising:

receiving means for receiving both of said modulated response upward signal from said response means and said modulated pager initiative upward signal from said initiative transmission means.

2. The paging system as claimed in claim 1, wherein said paging signal sequence transmitted from said base stations includes information designating a spreading code used for transmitting the response upward signal;

wherein each of said pagers further comprises code detection means for detecting from said paging signal sequence the first spreading code designated; and wherein said response means of the pager direct sequence spread spectrum modulates said response upward signal by using the first spreading code detected by said code detection means.

3. The paging system as claimed in claim 2, wherein each of said pagers comprises a pager spreading code memory; and wherein said initiative transmission means transmits the pager initiative signal by selecting said second spreading code other than the spreading code detected by said code detection means from said pager spreading code memory.

4. The paging system as claimed in claim 3, wherein each of said base stations further comprises a memory for storing said first spreading code designated for said pagers, and a spreading code memory for storing all of said second spreading codes to be used; and wherein said receiving means receives, using said first spreading code from said memory and said second spreading code from said spreading code memory excluding said first spreading codes stored in said memory, the response upward signal and the pager initiative upward signal from said response means and said initiative transmission means in each of said pagers, respectively.

5. The paging system as claimed in claim 1 or 2, wherein each of said pagers comprises a pager spreading code memory for storing a further group of second spreading codes different from a group of first spreading codes used by said response means; and wherein said initiative transmission means transmits the pager initiative signal by selecting one second spreading code of said further group from said pager spreading code memory.

6. The paging system as claimed in claim 5, wherein each of said base stations further comprises a memory for storing a group of said first spreading codes designated for said pagers, and a spreading code memory for storing said group of said second spreading codes; and wherein said receiving means receives said modulated response upward signal and said modulated pager initiative upward signal and obtains said first and second spread codes from said memory and said spreading code memory, respectively.

7. The paging system as claimed in claim 1, wherein each of said base stations further comprises a spreading code memory that stores all of said second spreading codes to be used; and wherein said receiving means receives said modulated response upward signal and said modulated pager initiative upward signal and obtains a second spread code from said spreading code memory in response to said upward signals received.

8. The paging system as claimed in claim 1, wherein the spreading codes used by said initiative transmission means are selected at random.

9. The paging system as claimed in claim 1, wherein said initiative transmission means transmits, as its pager initiative signal, at least one of a reply to a message from a user and a location registration signal.

10. A pager in a paging system that includes one or more base stations for transmitting to a radio zone a paging signal sequence, and one or more pagers for receiving at least one paging signal of the paging signal sequence transmitted from the one or more base stations, said pager comprising:

response means for direct sequence spread spectrum modulating, when the paging signal sequence received includes a paging signal addressed to the pager, a response upward signal acknowledging reception of the paging signal and for transmitting the modulated response upward signal; and initiative transmission means for direct sequence spread spectrum modulating a pager initiative upward signal by using a second spreading code different from a first spreading code used by said response means and for transmitting the modulated pager initiative upward signal, said pager initiative upward signal being an upward signal other than said response upward signal.

11. The pager as claimed in claim 10, wherein said paging signal sequence transmitted from said base stations includes information designating a spreading code used for transmitting the response upward signal;

wherein said pager further comprises code detection means for detecting from said paging signal sequence the first spreading code designated; and wherein said response means direct sequence spread spectrum modulates said response upward signal by using the first spreading code detected by said code detection means.

12. The pager as claimed in claim 11, further comprising a pager spreading code memory, wherein said initiative transmission means transmits the pager initiative signal by selecting said spreading code other than the spreading code detected by said code detection means from said spreading code memory.

13. The pager as claimed in claim 10 or 11, further comprising a pager spreading code memory for storing a further group of second spreading codes different from a group of first spreading codes used by said response means, wherein said initiative transmission means transmits the pager initiative signal by selecting one second spreading code of said further group from said pager spreading code memory.

14. The pager as claimed in claim 10, wherein the spreading codes used by said initiative transmission means are selected at random.

15. The pager as claimed in claim 10, wherein said initiative transmission means transmits, as its pager initiative signal, at least one of a reply to a message from a user and a location registration signal.

* * * * *